E. SCHNEIDER.
SPEEDOMETER.
APPLICATION FILED DEC. 10, 1912.

1,064,935.

Patented June 17, 1913.

2 SHEETS—SHEET 1.

Witnesses:

Inventor:
Ernest Schneider
per
Lawrence Langner
Attorney.

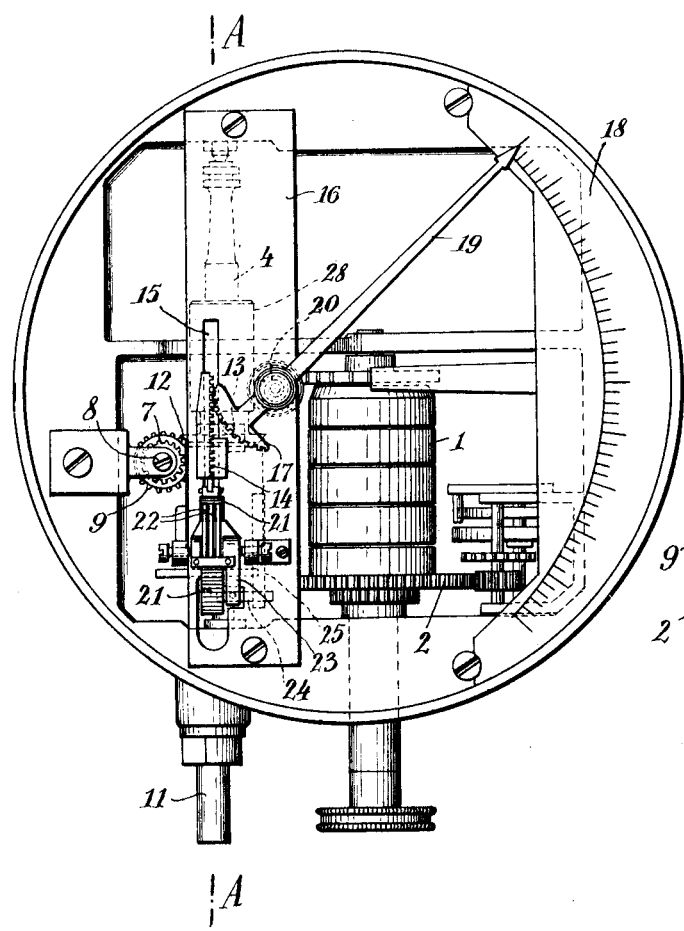

UNITED STATES PATENT OFFICE.

ERNEST SCHNEIDER, OF VIENNA, AUSTRIA-HUNGARY.

SPEEDOMETER.

1,064,935.   Specification of Letters Patent.   Patented June 17, 1913.

Application filed December 10, 1912. Serial No. 735,960.

*To all whom it may concern:*

Be it known that I, ERNEST SCHNEIDER, a subject of the Emperor of Austria-Hungary, residing at 8 Staglgasse, Vienna, XV, in the Empire of Austria-Hungary, have invented a certain new and useful Improvement in Speedometers, of which the following is a specification.

In the known Häushalter's speedometers, the index is adjusted by a falling weight in such manner that the falling weight, which is constantly and uniformly rotated by clockwork, is lifted by the shaft driven by the vehicle for a period of time determined by the clockwork and the index thereby displaced, while after the release of the weight and its consequent fall the index is retained frictionally, or if the index has stopped at a higher division in the preceding measuring period, it is shifted retractively by a worm connected with the falling weight, to the extent of the difference of the travel of the weight in the two measuring periods. This construction presents the defect that it does not admit of small measuring periods such as are now called for in the present state of the art, particularly by railway authorities. This defect is due to the fact that the pitch of the worm is dependent upon the measuring periods, to which it is inversely proportional, that is to say the pitch of the worm must be greater in proportion as the measuring period is smaller. As, however, the pitch can only be increased to a certain limit for a given travel of the weight, only a measuring period of 12 seconds is obtainable with this apparatus.

Now the present invention has for its object to provide for shorter measuring periods with such apparatus, amounting to as little as four or even two seconds. This result is attained owing to the fact that when the speed falls, the index is not set back by means of a worm but by the index, which is spring controlled and held in its end position by a catch, encountering the falling weight which is temporarily retained in its end position by a catch, this weight then falling after the index has again been returned.

Figure 1:
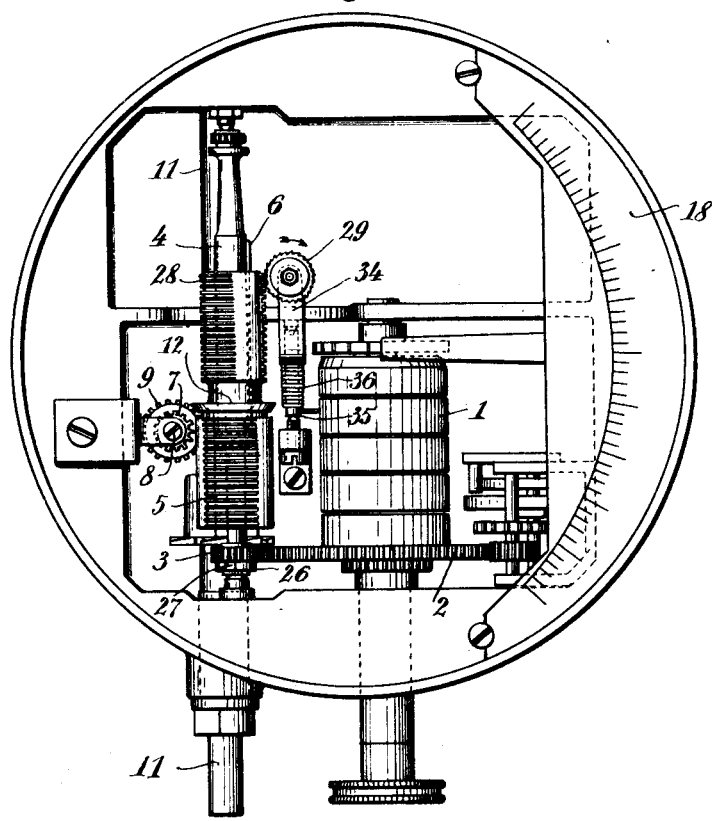
Figure 4:
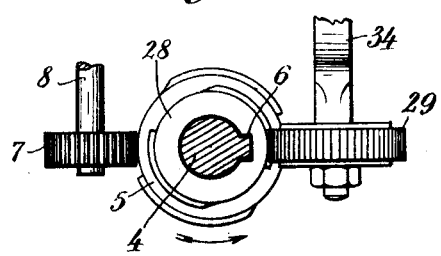
Figure 6:
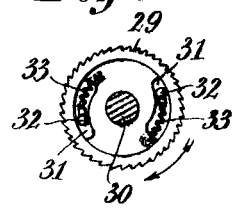
Figure 5:
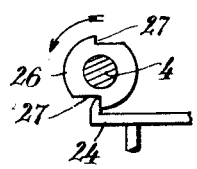

An apparatus embodying the invention is illustrated by way of example in the accompanying drawing, in which:

Figure 1 shows the apparatus in front elevation with the index mechanism removed. Fig. 2 is a similar view showing the index mechanism, and Fig. 3 is a section on the line A—A in Fig. 2. Figs. 4, 5 and 6 are detail views.

Upon the shaft 4 which is continuously and uniformly driven by the clock work 1 by the intermediary of the gear wheels 2 and 3, a cylindrical weight is displaceably arranged. This weight is coupled with the shaft by means of a groove and feather 6. The weight is toothed throughout its entire length, but these teeth are interrupted for a short distance on the periphery at one place or (as shown in the drawing) at two diametrically opposite places (Fig. 4). A gear wheel 7 is temporarily coupled with these interrupted teeth. Upon the shaft 8 of this gear wheel a worm wheel 9 is mounted and meshes with a worm 10 (Fig. 3) on a shaft 11 which is rotated by a part of the driving mechanism of the vehicle. On its upper edge the weight comprises a flange 12 upon which a roller 13 (Fig. 3) of a rack 14 rests. This rack is guided in a slot 15 in a plate 16. A toothed sector 17 of an index 19 which is formed as a two-armed lever and travels over a scale 18, engages the rack 14. A spiral spring 20 constantly tends to bring the index into the zero position and thereby to press the roller 13 on the flange of the weight 5. A second rack 21 (Fig. 2) is connected with the rack 14, a number of pawls 22 engaging in this rack 21. These pawls form a two-armed lever the free arm 23 of which is bent at right angles, its nose 24 (Figs. 3 and 6) under the influence of a spring 25 resting upon a disk 26 mounted on the shaft 4 (Fig. 6) whereby the pawls are held in engagement with the rack. This disk comprises two diametrically opposite recesses 27 by means of which the pawls 22 are momentarily disengaged from the rack 21. The toothed cylinder 5 is connected with a second toothed cylinder 28 which is arranged over it and together with the first cylinder constitutes the falling weight. The teeth of the cylinder 28 are also interrupted peripherally at two opposite places (Fig. 4). The untoothed portions of the two cylinders are slightly staggered relatively to each other so that in vertical projection each of the untoothed portions coincides with the tooth intervals of the other cylinder to a certain extent (see Fig. 4).

A ratchet wheel 29 engages the teeth of the cylinder 28. This wheel is rotatable in the direction indicated by the arrow (Fig.

1) but not in the opposite direction. In the example here illustrated this ratchet wheel is prevented from rotating in the one direction by one of the known friction clutches preferably of the following construction: Upon a fixed disk 30 (Fig. 5) a toothed ring 29 is rotatably mounted and between it and the disk two diametrically opposite wedge-shaped slots 31 are provided. Balls or bolts 32 are inserted in these slots and are pressed by springs 33 against the narrower portion of the slots. When the toothed ring 29 rotates in the direction indicated by the arrow, these bolts 32 are carried into the widened portion of the slots 31 and thereby render the toothed ring free to rotate, while when the ring tends to rotate in the other direction, they bind between the ring and the disk and thereby fix the ring. This toothed ring or ratchet wheel 29 is mounted on an arm 34 rockable in the horizontal plane. Upon the pivot 35 of this arm a spring 36 is coiled and holds the arm with the ratchet wheel 29 applied to the toothed cylinder 28.

The apparatus operates in the following manner: Owing to the rotation of the falling weight 5 produced by the clockwork (Figs. 1, 2 and 3) this weight is brought into engagement at given intervals for a given period of time with the gear wheel 7, whereby the weight is raised to a certain height. As the travel of the weight is directly proportional to the speed of the driving shaft, the index 19 displaced by the weight is shifted to the position upon the scale corresponding to the speed attained by the vehicle in the measuring period and it is held in this position by the pawls 22 engaging in the rack 21. Now when the connection between the gear wheel 7 and the weight 5 has been disestablished, the ratchet wheel 29 is still in engagement with the upper cylinder 28 and temporarily prevents the weight from falling. During this period the nose 24 on the pawl lever 23 enters one of the recesses 27 in the disk 26 and releases the rack 21, so that in case the index 19 at the preceding adjustment has been set at a higher division of the scale, it will under the influence of the spring 20 be moved until it encounters the flange of the weight which occupies its end position and thereafter be able to spring back into the position corresponding to the speed for the time being, whereupon with the further rotation of the shaft 4, the nose 24 again leaves the recess 27 in the disk 26, and the pawls 22 reëngage with the rack 21. Now when the index is held, the ratchet wheel 29 reaches an untoothed portion of the cylinder 28, so that the weight is free and able to fall, whereupon the operation recommences. If the speed at which the vehicle travels has become higher, the weight, and with it the rack 21, will have been raised to an extent corresponding to the increase of speed. If, on the other hand, the speed has diminished, the weight will have been raised to a smaller extent corresponding to the diminution of speed and consequently the rack also will have fallen in proportion to this reduction of speed, and the index will indicate this alteration of speed. Finally, if the speed has remained the same, the index will retain its position unaltered. It should also be noted that the displacement of the rack in the upward direction is rendered possible owing to the fact that the pawls 22 are resilient, as shown in Fig. 3.

What I claim and desire to secure by Letters Patent of the United States is:—

1. A speedometer comprising driving means, weighted means formed with a plurality of interrupted teeth on the periphery thereof, means for rotating said weighted means at a constant speed, means to establish an intermittent connection between said driving means and said weighted means by the engagement of said connecting means with said interrupted peripheral teeth, to move said weighted means a determined distance in accordance with the speed for the time being, indicating means controlled by the movement of said weighted means, and means comprising a ratchet wheel engaging with said interrupted peripheral teeth normally to retain said weighted means in position until the positioning of said indicating means and to allow said weighted means to move in the opposite direction to re-occupy its initial position.

2. A speedometer comprising driving means, weighted means, means to rotate said weighted means continuously at a uniform speed, means to establish an intermittent connection between said driving means and said weighted means to move said weighted means into a position corresponding with the speed for the time being, means to lock said wighted means upon the completion of such movement, indicating means controlled by said weighted means, means to lock said indicating means upon the positioning thereof to indicate the speed for the time being, said means comprising a rack in engagement with said indicating means, a wheel formed with a plurality of recesses, means to rotate said wheel at a speed corresponding to that of said weighted means, and a pawl member having one end engaging with said rack and its other end engaging the periphery of said wheel and becoming temporarily disengaged from said rack upon entering said recesses, and means to release said weighted means to enable said weighted means to re-occupy its initial position.

3. A speedometer comprising driving means, weighted means, means for rotating said weighted means at a constant speed, means to establish an intermittent connection between said weighted means and said driving means to move said weighted means a determined distance in the axial direction, a spring-pressed index controlled by said weighted means during its aforesaid movement, means temporarily to release said index to place the same under the action of its spring upon the completion of said movement, to occupy a position corresponding to the speed for the time being, and means to allow said weighted means upon such positioning of said index to move in the opposite direction to re-occupy its initial position for the next following operation.

4. A speedometer comprising driving means the speed of which is to be measured, weighted means, means to rotate said weighted means continuously at a constant speed, means to establish an intermittent connection between said weighted means and said driving means to move said weighted means for a determined distance in an axial direction in accordance with the magnitude of the speed for the time being, indicating means controlled by said weighted means during such axial movement thereof, means to lock said weighted means in position at the completion of such axial movement, means temporarily to release said indicating means, means upon such release to move said indicating means to take up a determined position to indicate the speed for the time being as determined by the movement of said weighted means, means to lock said speed indicating means temporarily in position upon the positioning thereof to indicate the speed for the time being, a releasing means for said weighted means to allow the latter to move axially in the opposite direction to re-occupy its initial position.

5. A speedometer comprising driving means the speed of which is to be measured, a shaft, weighted means mounted on said shaft and rotated thereby continuously at a uniform speed, means to establish an intermittent connection between said weighted means and said driving means to move said weighted means along said shaft for a determined distance according to the speed for the time being, a spring-pressed speed indicator, means to connect said weighted means with said indicator to control the movement of said speed indicator, means to lock said weighted means in position upon the completion of its movement, releasing means to cause said speed indicator and said connecting means therefor by the action of said spring to take up a position according to the speed for the time being so that if the speed of the preceding operation is greater than that for the time being, said speed indicator and connecting means therefor can move under the action of the spring of said speed indicator to take up a position corresponding with that of the weighted means, means to lock said speed indicator in such adjusted position, and means to release said weighted means to allow same to move axially in the opposite direction to re-occupy its initial position preparatory to the next operation.

In testimony whereof I affix my signature in presence of two witnesses.

ERNEST SCHNEIDER.

Witnesses:
KARL REHAK,
HERMAN WUNDERLICH.

---

Copies of this patent may be obtained for five cents each, by addressing the "Commissioner of Patents, Washington, D. C."